United States Patent [19]

Seabra

[11] Patent Number: 4,951,391

[45] Date of Patent: Aug. 28, 1990

[54] METHOD OF MANUFACTURING FITTINGS FOR TUBE OR PIPE

[75] Inventor: Helio L. Seabra, Sao Paulo, Brazil

[73] Assignee: Alcon Corporation, Wayne, N.J.

[21] Appl. No.: 730,391

[22] Filed: May 3, 1985

[51] Int. Cl.[5] .............................................. B23P 15/00
[52] U.S. Cl. ................................. 29/890.14; 29/558; 409/132; 409/244
[58] Field of Search ................. 29/557, 558, DIG. 26, 29/157 R; 285/322, 323, 324, 257, 382, 243; 409/244, 259, 131, 132; 279/41 R, 46 A

[56] References Cited

U.S. PATENT DOCUMENTS

| | | | |
|---|---|---|---|
| 1,227,632 | 5/1917 | Lagerbäck | 285/322 X |
| 1,450,189 | 4/1923 | Smith | 279/41 |
| 2,105,618 | 1/1938 | Silva | 29/558 X |
| 2,595,828 | 5/1952 | Cox | 279/46 A |
| 2,689,740 | 9/1954 | Parigian | 279/46 A |
| 2,749,135 | 6/1956 | Little | 279/46 A X |
| 3,716,246 | 2/1973 | Peterson | 29/558 X |
| 3,884,513 | 5/1975 | Gassert | 285/322 |
| 4,013,310 | 3/1977 | Dye | 285/322 X |
| 4,245,846 | 1/1981 | Andrews | 29/558 X |
| 4,508,369 | 4/1985 | Mode | 285/323 X |

Primary Examiner—Joseph M. Gorski
Attorney, Agent, or Firm—Pennie & Edmonds

[57] ABSTRACT

An improved method for making insert sleeves for tube fittings or quick couplings comprising forming V-shaped cut-aways in the gripping edge and inner surface of the insert sleeve then forming slots or kerfs in the sleeve, each slot or kerf being centered on and having a slightly narrower circumferential width than the cut-aways such that a chamfered corner is provided where the gripping edge or inner surface meets the slot.

8 Claims, 2 Drawing Sheets

METHOD OF MANUFACTURING FITTINGS FOR TUBE OR PIPE

BACKGROUND OF THE INVENTION

1. Field of The Invention

The invention relates to couplings for tubes or pipes. In particular the invention relates to a method of manufacturing push-in tube fittings.

2. Background of The Invention

Quick couplings or push-in tube fittings of the type similar to U.S. Pat. No. 3,884,513 or U.S. Pat. No. 4,013,310 are a fast, convenient way of making leak-proof connections. The coupling is comprised of two main members; a first insert sleeve member having an axial passage and jaws or gripping fingers projecting radially inwardly at one end of the axial passage, and a second member encircling the first member to clamp the jaws or gripping fingers of the first member onto a tube or pipe which is inserted into the axial passage of the first member. In use, any movement of the tube or pipe in a withdrawing direction will cause relative movement of the two members to increase the force exerted by the gripping fingers on the tube or pipe inserted into the coupling.

The conventional method of manufacturing the insert sleeve having gripping fingers and an internal circumferential gripping edge has some deficiencies which prevent the assembled sleeve from having the necessary leak-proof connection. The method of manufacturing such a sleeve is by first forming the gripping edge and then milling longitudinal slots or kerfs in the sleeve to form the fingers. This method, however, leaves burrs on the corners of the gripping edges where the slots are formed; and these burrs can damage the inserted tube. To eliminate the burrs requires an expensive and unreliable deburring step after milling.

SUMMARY OF THE INVENTION

This problem is virtually eliminated by the method of the present invention. In accordance with the teachings of the present invention, the insert sleeve is manufactured by first forming V-shaped cut-aways in the gripping edge by a broaching operation, and then milling the slots or kerfs at the vertices of the cut-aways to form the fingers. As a result of these steps, the fingers of the insert sleeve are left with chamfered edges, free from burrs which could otherwise damage the tube. In an alternate embodiment, the V-shaped cut-aways are formed along the inner surface of the insert sleeve so the entire length of each slot has chamfered longitudinal edges.

In other arts a cylindrical gripping sleeve has been provided with V-shaped cut-aways. For example, U.S. Pat. No. 2,595,828 and U.S. Pat. No. 2,749,135 disclose a cylindrical sleeve for holding stock in a milling machine or the like. The sleeve has gripping fingers similar to those used in quick couplings, however, the V-shaped cut-aways are not aligned with the slots or kerfs in the sleeve. This is because the articles are used to hold the stock in place. The cut-aways are merely to prevent rotation of square or multisided stock by gripping the corners of the stock with the cut-aways.

DESCRIPTION OF THE PREFERRED EMBODIMENT

Figure 1:
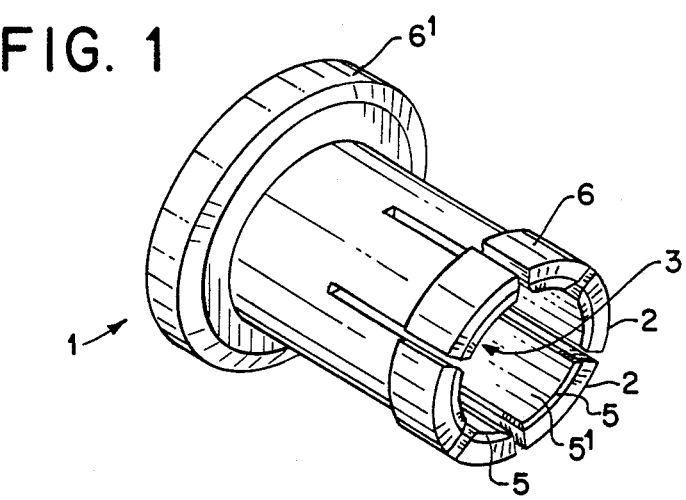
FIG. 1 is a perspective view of the sleeve of the present invention.
Figure 2:
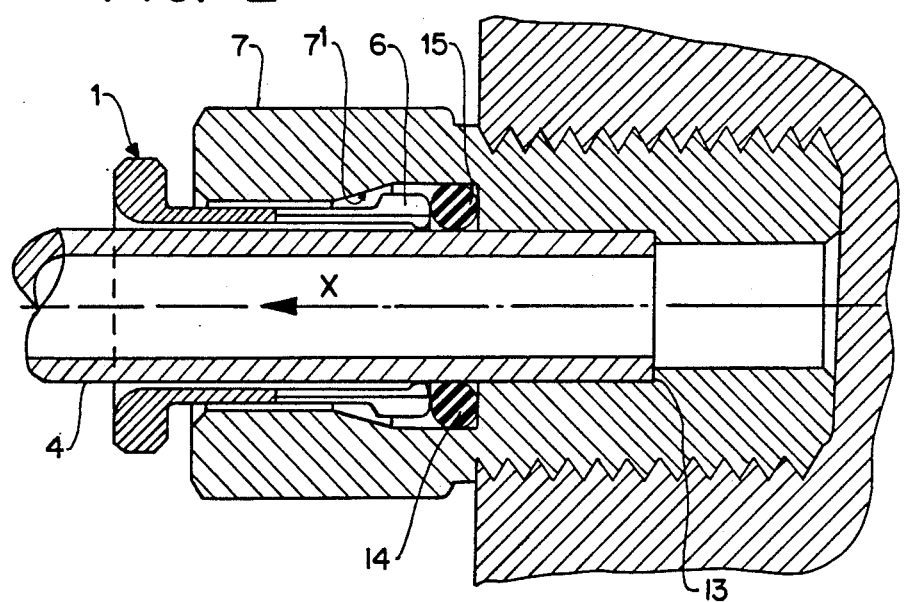
FIG. 2 is a cross-sectional view of an assembled tube fitting using the sleeve of the invention.

The tube fitting includes a sleeve 1 which is generally cylindrical in shape and has gripping fingers 2 extending therealong at one end to define an axial passage 3 for receiving a tube 4 which is to be clamped by the fitting. The free ends of the fingers extend radially inwardly of the sleeve to define a gripping edge 5 which grips the tube 4 when the fitting is in use. On the outside of the sleeve at the end of each gripping finger 2 is an annular protuberance 6 which projects beyond the otherwise cylindrical outer surface of sleeve 1 and its gripping fingers 2. In use, the sleeve is assembled inside an outer housing member 7 of the fitting as shown in FIG. 2. The tube 4 is inserted through the inner sleeve, also as shown in FIG. 2, with the gripping edges 5 in their gripping fingers 2 engaging against the outer surface of the tube to hold it in place. Any movement of the tube in a withdrawing direction will tend to shift the sleeve member axially in the same direction within the outer housing 7. This in turn will cause the proturberances 6 to engage against the internal chamfered surface 7' of the housing. This action will force the finger radially inwardly to tightened their grip on the tube and thus prevent its withdrawal.

At the end of the sleeve opposite protuberance 6 is a sleeve portion of enlarged cross-section which forms shoulder 6'. Shoulder 6' provides a convenient gripping surface to manipulate the fitting assembly.

Figure 3:
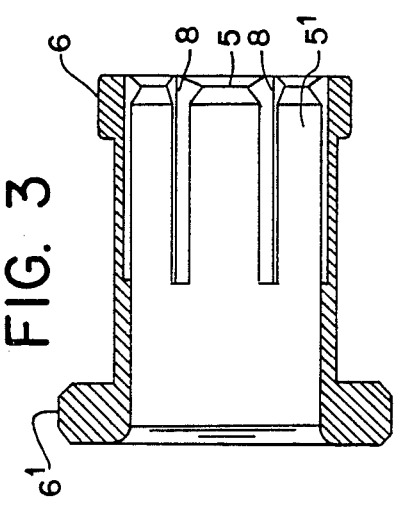
FIG. 3 is a cross-sectional view of the sleeve at an intermediate stage in the process of the invention.

The sleeve 1 is formed of metal such as brass and initially has a cross-sectional shape similar to that shown in FIG. 3 but without the V-shaped cut-aways 8. At this point in the manufacturing process, the sleeve has axial passage 3, a single gripping edge 5, protuberance 6 (prior to its division in the finger formation) and shoulder 6'.

Figure 4:
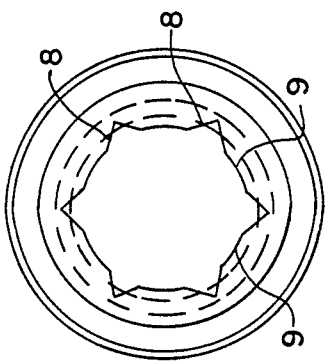
FIG. 4 is an axial view of the sleeve shown in FIG. 3.

At this point a hexagonally shaped broaching tool is used to form the V-shaped cut-aways 8 in gripping edge 5 (FIG. 3 and 4). Although it is only necessary to broach the gripping edge 5, in the preferred embodiment the inner surface 5' of the insert sleeve is also broached to provide the desired V-shaped cut-aways. The hexagon size of the broaching tool is large enough to cut into the gripping edge 5 to form the cut-aways 8 but not so large as to make arcuate portions 9 flat. Although the preferred shape of the aperture is a hexagon, other shapes may be used. Normally the shape is selected to provide the same number of cut-aways as there will be kerfs or slots in the final sleeve. The kerfs or slots 10 are cut axially in the wall of sleeve 1. Each slot is milled in sleeve 1 and centered at the vertex of a cut-away 8. The slots 10 extend about two-thirds of the length of sleeve 1. This produces the gripping fingers which will flex to provide the gripping force when the sleeve is in use.

Figure 6:
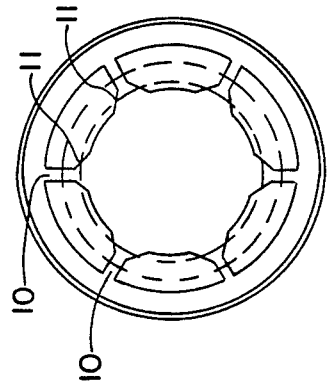
FIG. 6 is an axial view of the sleeve shown in FIG. 5.
Figure 5:
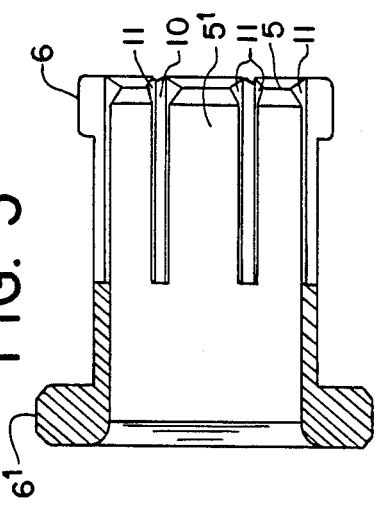
FIG. 5 is a cross-sectional view of the completed sleeve of the invention.

As is seen in FIGS. 5 and 6, a small portion of each cut-away 8 remains and extends beyond each slot 10. This is because the slots are smaller in their circumferential width than the cut-aways 8. The extra width of the cut-aways 8 leave chamfered edges 11 on the corners where the gripping edge 5 meets the slots 10 and along the inner sleeve surface 5' where it meets each slot.

Once formed the sleeve 1 is used in a tube fitting of the type shown in FIG. 2. The housing member 7 fits over sleeve 1. The housing member 7 has an axial passage which has differing diameters along its length. The housing member 7 is threaded into the aperture which is to be connected by the quick coupling. Alternatively, the housing member 7 may be part of fittings such as tees and elbows which are to be connected to tubing via quick coupling.

The housing member 7 has a shoulder 13 formed by the differing diameter of the axial passage through the member. Tube 4 butts against this shoulder and is sealed by sealing means 14 which is held by a second shoulder 15.

When the tube 4 is under pressure, it will be urged in the direction of arrow X. Because there is frictional contact between sleeve 1 and tube 4, sleeve 1 will be urged in the same direction. The internal passage of the housing has chamfered portion 7'. When the protuberances 6 meet portion 7', they will be forced inward clamping the tube 4 in place. Any increase in the force tending to cause the tube to move relative to the housing member will increase the gripping force of the fingers. The gripping fingers 2 will remain clamped against tube 4 even after the internal pressure of tube 4 is relieved.

To remove tube 4 from the fitting, sleeve 1 must be moved in the direction opposite arrow X by the application of an external force to portion 6'. This allows the ends of the gripping fingers with protuberances 6 on them to move into the wider portion of axial passage of housing member 7 which permits the expansion of the gripping fingers and releases tube 4.

If the tube is to be used to supply a suction or vacuum, then sleeve 1 is manually moved in the direction of arrow X by pulling on shoulder 6' after tube 4 is inserted and will remain clamped until released by the application of an external force to shoulder 6' which moves sleeve 1 in the direction opposite arrow X.

With the above construction of the sleeve whereby the chamfered edges are formed in the gripping edge and along each slot, any burrs that might be created by forming the slots will not engage against the tube 4. The edges of these slots are disposed radially outwardly of the gripping edge 5 of the finger because of the performed V-shaped cutouts forming the chamfered edges.

I claim:

1. A method of manufacturing a sleeve insert for a tube fitting comprising the steps of:
   (a) forming a cylindrically shaped sleeve with:
      (1) an axial passage extending into one axial end thereof, and
      (2) a radial thickness at said one axial end that is larger than the radial thickness of the sleeve at an axially intermediate section to define a radially inwardly facing circumferentially extending gripping edge at said axial end;
   (b) forming a plurality of circumferentially spaced cut-aways into said gripping edge without forming burs during the forming of the cut-aways, each of said cut-aways having a predetermined circumferential width and edges joining the gripping edge which are free of burrs; and
   (c) forming axially extending slots in said sleeve after step (b) to form a plurality of gripping fingers at the one axial end thereof, said slots extending radially through said sleeve and the gripping edge thereof and axially aligned with a separate one of said cut-aways, and also having a cirucumferential width in the gripping edge which is less than the circumferential width of said cut-aways.

2. The method according to claim 1, wherein:
   (a) said gripping edge extends radially inwardly of the sleeve beyond the intermediate section thereof.

3. The method according to claim 2 wherein:
   (a) the cut-aways are V-shaped in cross-section as viewed axially of said sleeve; and
   (b) the slots are each aligned centrally of said cut-aways.

4. The method according to claim 3 including:
   (a) forming said cut-aways by broaching; and
   (b) forming said slots by milling.

5. The method according to claim 4 including:
   (a) forming six equally spaced cut-aways 6. The method according to claim 5 including:
   (a) forming the axial passage through the entire axial dimension of said sleeve.

7. The method according to any one of claim 2-6 including:
   (a) forming said cut-aways only in said gripping edge; and
   (b) forming said slots in said gripping edge and the axially intermediate section of said sleeve.

8. A method of manufacturing a sleeve insert for a tube fitting comprising the steps of:
   (a) forming a cylindrically shaped sleeve with:
      (1) an axial passage extending into one axial end thereof, and
      (2) a radial thickness at said one axial end that is larger than the radial thickness of the sleeve at an axially intermediate section to define a radially inwardly facing circumferentially extending gripping edge at said axial end;
   (b) forming a plurality of circumferentially spaced cut-aways into said gripping edge without forming burrs during the forming of the cut-aways, each of said cut-aways having a predetermined circumferential width and edges joining the gripping edge which are free of burrs; and
   (c) forming axially extending slots in said sleeve after step (b) to form a plurality of circumferentially spaced axially extending gripping fingers at the one axial end thereof, said slots extending radially through said sleeve and the gripping edge thereof and axially aligned with a separate one of said cut-aways, and also having a circumferential width in the gripping edge which is less than the circumferential width of said cut-aways, said slots further being a finite dimension to space said fingers from each other along their entire axial length.

* * * * *

UNITED STATES PATENT AND TRADEMARK OFFICE
CERTIFICATE OF CORRECTION

PATENT NO. : 4,951,391

DATED : August 28, 1990

INVENTOR(S) : Helio L. Seabra

It is certified that error appears in the above-identified patent and that said Letters Patent is hereby corrected as shown below:

On the bibliography page at Item [73] Assignee, please delete "Alcon" and insert therefor --Alkon--.

Signed and Sealed this

Thirty-first Day of December, 1991

Attest:

HARRY F. MANBECK, JR.

*Attesting Officer*  *Commissioner of Patents and Trademarks*